C. BERTOLOTTI & D. PICCARDO.
CONFECTION IMMERSING MACHINE.
APPLICATION FILED DEC. 8, 1910.
1,004,232.
Patented Sept. 26, 1911.
4 SHEETS—SHEET 3.
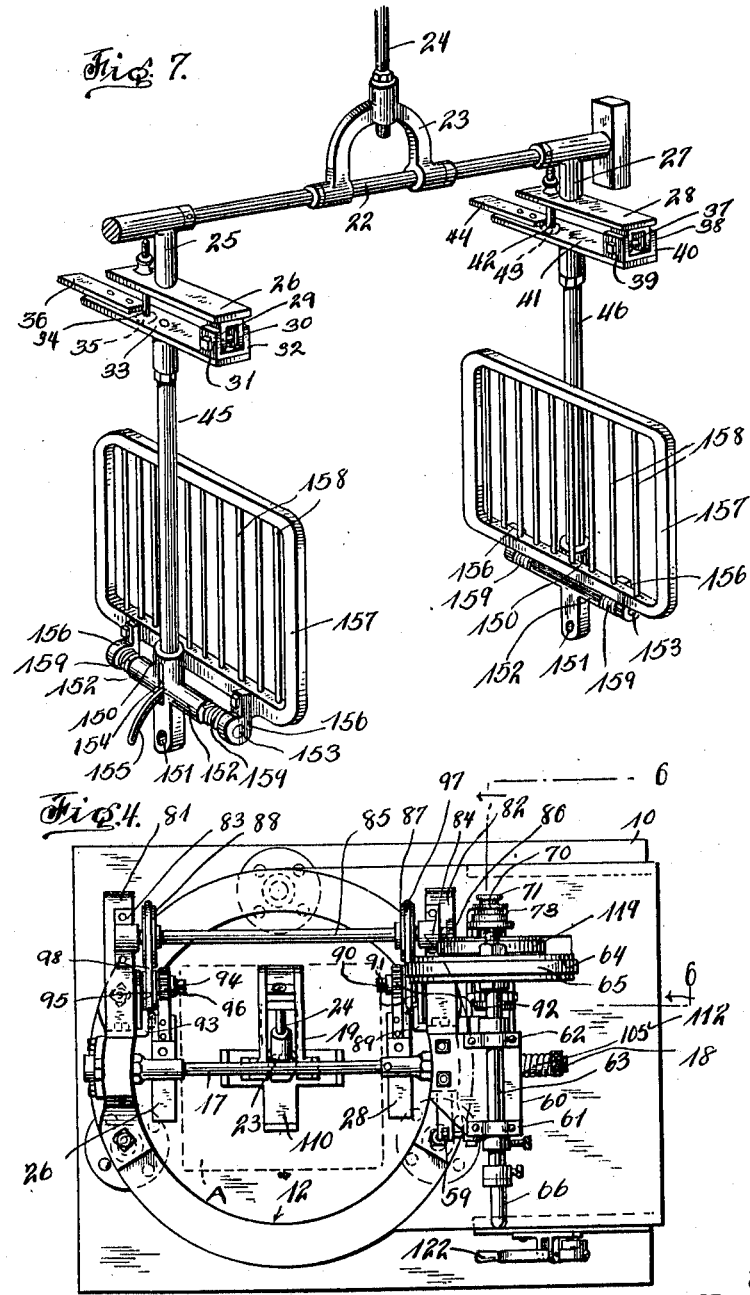
Witnesses
Inventors
Constantino Bertolotti
and Dionisio Piccardo.
Attorneys C. BERTOLOTTI & D. PICCARDO.
CONFECTION IMMERSING MACHINE.
APPLICATION FILED DEC. 8, 1910.
1,004,232.
Patented Sept. 26, 1911.
4 SHEETS—SHEET 4.
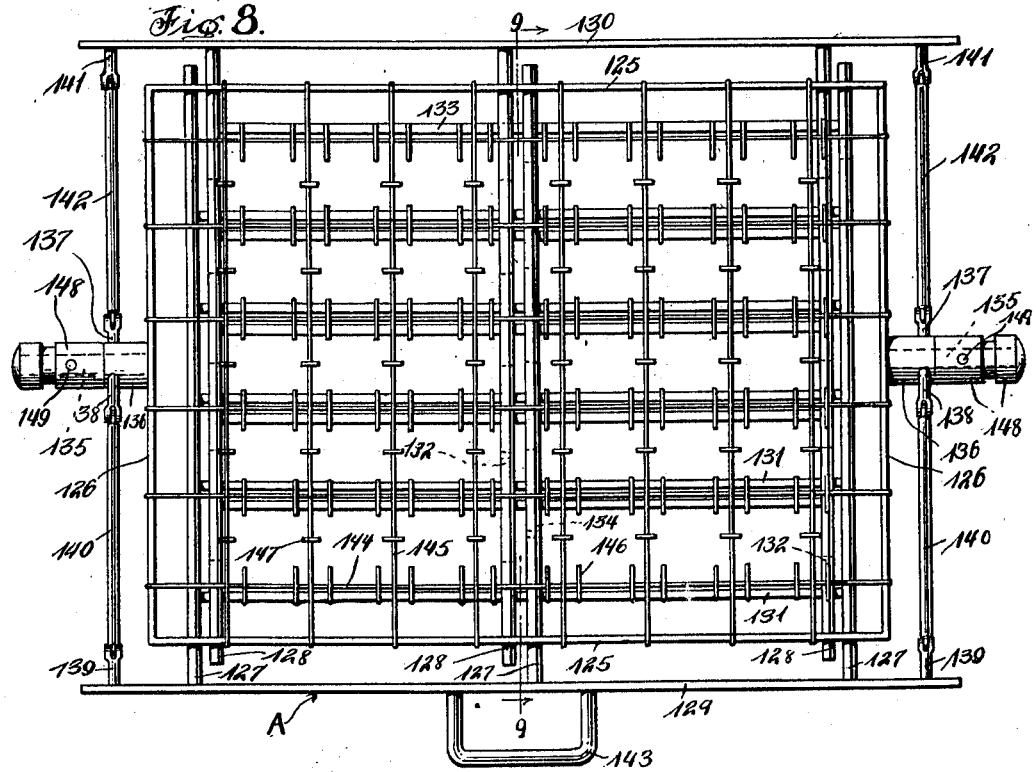
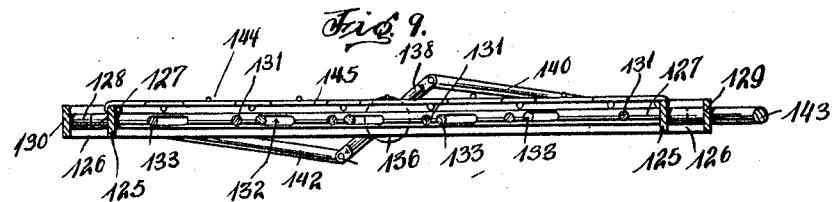
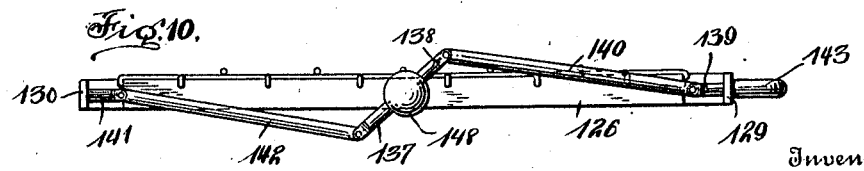
Witnesses
Inventors
Constantino Bertolotti
Dionisio Piccardo
By
Attorneys

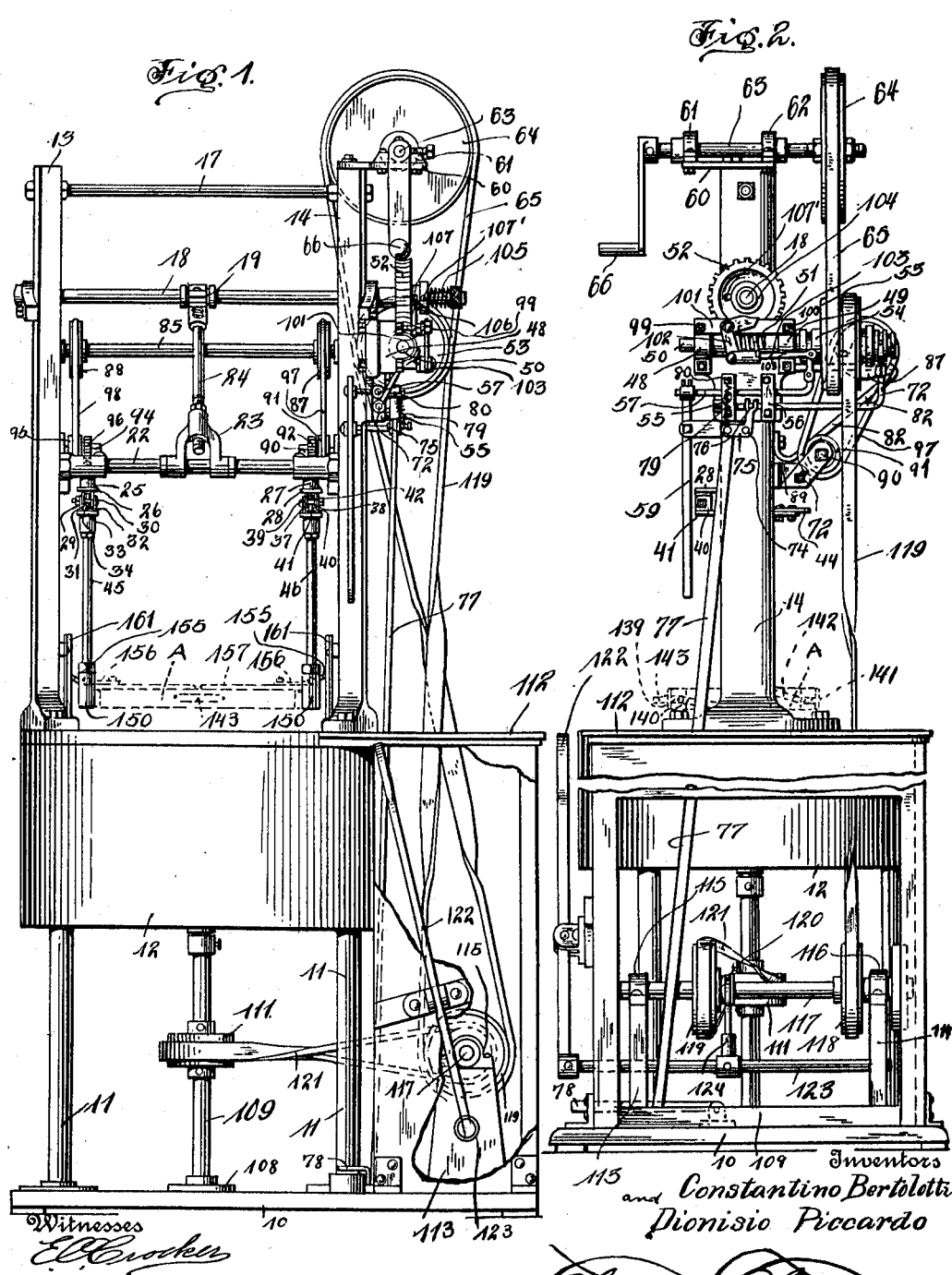

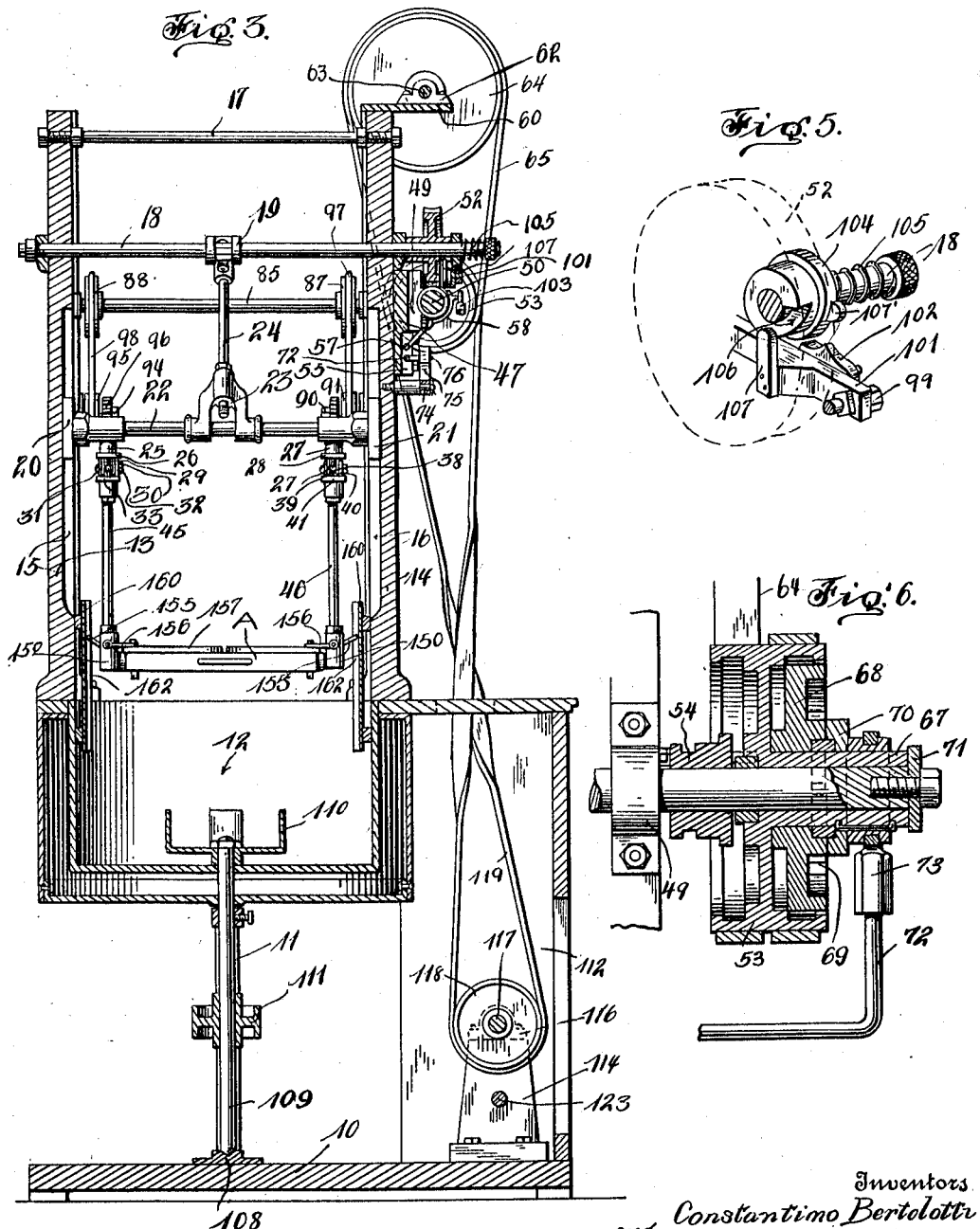

UNITED STATES PATENT OFFICE.

CONSTANTINO BERTOLOTTI AND DIONISIO PICCARDO, OF NEW YORK, N. Y.

CONFECTION-IMMERSING MACHINE.

1,004,232. Specification of Letters Patent. Patented Sept. 26, 1911.

Application filed December 8, 1910. Serial No. 596,249.

*To all whom it may concern:*

Be it known that we, CONSTANTINO BERTOLOTTI and DIONISIO PICCARDO, the former a citizen of the United States and the latter a subject of the King of Italy, residing at New York, in the county of New York, State of New York, have invented certain new and useful Improvements in Confection-Immersing Machines; and we do hereby declare the following to be a full, clear, and exact description of the invention, such as will enable others skilled in the art to which it appertains to make and use the same.

This invention relates to confection immersing machines.

The object of the invention resides in the provision of a machine through the instrumentality of which a plurality of confection cores may be simultaneously moved into and out of an immersing tank for the purpose of coating the same with chocolate.

A further object of the invention resides in the provision of a machine of the character described which includes a vertically reciprocating confection core supporting basket adapted for movement into and out of an immersing tank and in providing means whereby the reciprocation of said basket is automatically stopped at the termination of each upward stroke thereof.

Another object of the invention resides in the provision of a confection immersing machine which includes a new and improved form of core supporting basket so constructed and arranged that after said cores have been immersed in chocolate, the former may be discharged downwardly from the basket in such manner as to obviate any possibility of disfigurement or injury to the coating of the core.

A still further object of the invention resides in providing means whereby the confection core supporting basket heretofore referred to will be sharply agitated just prior to the limit of its upward movement so as to shake from said basket and the confection cores carried thereby all surplus and unnecessary chocolate and thus render the amount of coating carried by each core of a uniform character.

Finally, the object of the invention resides in the provision of a machine of the character named which will be simple in construction, efficient in use and comparatively inexpensive to manufacture.

With these and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views; and in which, Figure 1 is a side elevation of a confection immersing machine constructed in accordance with the invention, certain parts of the frame of the machine being broken away; Fig. 2, an end view of the machine looking to the left in Fig. 1, with the central portion of said machine broken away; Fig. 3, a vertical longitudinal section of the machine; Fig. 4, a plan view of the machine; Fig. 5, a detail perspective view of a portion of the mechanism employed to automatically disconnect the core supporting basket from the drive shaft shown at the termination of each movement of said basket out of the immersing tank; Fig. 6, an enlarged section on the line 6—6 of Fig. 4; Fig. 7, an enlarged detail perspective view of a carrier bar and the hangers suspended therefrom which support the confection core immersing basket, and showing the manner of mounting the cover sections for said basket on said hanger bars; Fig. 8, an enlarged plan view of the confection core supporting basket; Fig. 9, a section on the line 9—9 of Fig. 8; and Fig. 10, an end view of the basket illustrated in Fig. 9.

Referring to the drawings, the machine is shown as comprising a base 10, from which rise a plurality of standards 11. Supported upon the upper ends of the standards 11 is a plural wall immersing tank 12 in which is adapted to be stored the material with which the confection cores are to be coated. Rising from the upper end of the wall of the tank 12 at diametrically opposite points are corresponding uprights 13 and 14 which have formed on their inner faces corresponding grooves 15 and 16 respectively. These uprights 13 and 14 are braced at their upper ends by means of a rod 17. Journaled between the uprights 13 and 14 beneath the rod 17 and having one end extending beyond the upright 14 is a shaft 18 which is provided centrally with a crank portion 19. Slidably mounted in the grooves 15 and 16 are blocks 20 and 21 respectively, which have secured thereto respectively the opposite ends of a supporting bar 22. This bar 22 has mounted centrally thereon a rotatable U shaped member 23, the body portion of which has rigidly secured thereto the lower end of a stem 24, the upper end of said stem being pivotally connected to the crank arm 19 of the shaft 18. By this construction, it will be apparent that as the shaft 18 is rotated, the supporting bar 22 and the blocks 20 and 21 will be reciprocated vertically in unison. Depending from the inner end of the block 20 is a stud 25, which terminates in a plate 26 disposed transversely of the bar 22. A corresponding stud 27 depends from the inner end of the block 21 and terminates in a plate 28 similar to the plate 26 and disposed transversely of the bar 22. The plate 26 is provided at one end with a pair of depending ears 29 and 30 which are embraced by and pivotally connected to a pair of ears 31 and 32 formed on a plate 33 disposed in spaced relation to the plate 26. By this construction, it will be apparent that the plate 33 is mounted so as to be capable of a swinging movement toward and away from the plate 26. The movement of this plate 33 away from the plate 26 is limited by means of a bolt 34 fixed to the plate 26 and extending through the plate 33, the outer end of this bolt being provided with an enlarged portion 35 for engagement with the outer face of the plate 33. Projecting from the free end of the plate 33 longitudinally thereof is a resilient tongue 36 for a purpose that will presently appear. Likewise, the plate 28 is provided at one end with depending spaced ears 37 and 38 which are embraced by and pivotally connected to a pair of ears 39 and 40 formed on a plate 41 which is disposed in spaced relation to the plate 28. This plate 41 is thus capable of a swinging movement toward and away from the plate 28 as will be apparent. The movement of the plate 41 away from the plate 28 is limited by means of a bolt 42 fixed to the plate 28 and projecting through the plate 41, the outer end of said bolt being provided with an enlarged portion 43 adapted for engagement with the outer face of the plate 41. Mounted longitudinally upon the plate 41 and projecting from the free end thereof is a resilient tongue 44 for a purpose that will presently appear. Supported by and depending from the plate 33 is hanger bar 45, while a corresponding hanger bar 46 is supported by and depends from the plate 41. Secured to the lower ends of the hanger bars 45 and 46 is a confection core supporting basket A which will be hereinafter more particularly described.

Supported upon the outer face of the upright 14 just beneath the shaft 18 is a plate 47 which has secured thereto a pair of spaced journal blocks 48 and 49, in which is rotatably mounted a shaft 50. Mounted upon this shaft between the journal blocks 48 and 49 is a worm 51, which meshes with a worm wheel 52 fixed upon the shaft 18 so that a rotation of the shaft 50 will in turn rotate the shaft 18. Loosely mounted upon the shaft 50 adjacent the journal block 49 is a belt wheel 53, and slidably mounted upon the shaft 50 between the belt wheel 53 and the journal block 49 is a clutch 54. Mounted upon the plate 47 beneath the shaft 50 is a pair of spaced blocks 55 and 56 in which is slidably mounted for movement longitudinally of the shaft 50 a rod 57. This rod has one end thereof bent upwardly and secured to a clutch yoke 58 which operatively engages the clutch 54. The other end of said rod 57 is operatively connected to a lever 59 which is pivotally mounted upon the upright 14. By this construction, it will be apparent that as the lever 59 is oscillated, the rod 57 will be reciprocated so as to throw the clutch 54 into and out of engagement with the loose belt wheel 53.

Another plate 60 is mounted upon the top of the upright 14 and is provided on its upper face with spaced journal blocks 61 and 62, in which is journaled a drive shaft 63. Mounted on the drive shaft 63 adjacent the journal block 62 and in vertical alinement with the belt wheel 53 is another belt wheel 64, and traveling upon the latter and the belt wheel 53 is a belt 65. Fixed upon the shaft 63 adjacent the journal block 61 is a crank 66, through the instrumentality of which the shaft 63 is rotated. It will of course be understood that where the machine is operated by other than manual force, the crank 66 is dispensed with and a suitable connection mounted on the shaft 63 in lieu thereof.

The belt wheel 53 has the outer end of its hub extended, as at 67, and loosely mounted upon this extension of the hub and confined largely within the periphery of said belt wheel is a disk 68 having teeth 69 mounted on the outer face thereof and extending around its circumference. Keyed upon the hub extension 67 outwardly of the disk 68 is a clutch member 70 adapted to be moved into and out of operating engagement with the disk 68. This clutch member 70 is held against displacement from the hub extension 67 by means of a washer 71 secured on the end of the shaft 50. Slidably mounted in the blocks 55 and 56 beneath the rod 57 is another rod 72, one end of which is bent and secured to a clutch yoke 73 engaging the clutch member 70. Extending laterally from the outer face of the upright 14 is a stud 74 which has pivotally mounted on its outer end an angle lever 75. One arm of this angle lever 75 has its outer end forked and disposed between the arms of said forked outer end is a pin 76 projecting laterally from the rod 72. The free end of the other arm of the lever 75 has pivotally connected thereto the upper end of a link 77, the lower end of said link being pivotally connected to a treadle lever 78, which latter is pivotally supported upon the base 10. A spring 79 has one end secured to the arm of the angle lever 75, which is connected to the link 77, and its other end secured to a pin 80 projecting laterally from the block 55. This spring serves to normally hold the rod 72 so as to maintain the clutch connection 70 out of engagement with the disk 68, the operation of the clutch connection 70 into engagement with the disk 68 being effected by depressing the treadle lever 78.

Secured to each of the uprights 13 and 14 and extending laterally therefrom on the same side as the belt wheel 53 are brackets 81 and 82 respectively and mounted upon these brackets in corresponding position are bearings 83 and 84 respectively. Journaled in the bearings 83 and 84 is a shaft 85 which extends beyond the bearing 84 on one end, and has mounted on said extension a gear wheel 86 meshing with the teeth 69 of the disk 68. Also fixed on the shaft 85 just inward of the bracket 82 is a grooved pulley 87, while a corresponding grooved pulley 88 is fixed on said shaft just inward of the bracket 81. Mounted on the upright 14 at the lower end of the bracket 82 is a journal bracket 89, which has mounted therein a rotatable shaft 90 carrying on its inner end a grooved pulley 91 and a toothed wheel 92, said grooved pulley 91 being disposed in alinement with the grooved pulley 87 on the shaft 85. Likewise mounted on the upright 13 is a journal bracket 93, which has mounted therein a rotatable shaft 94, carrying on its inner end a groved pulley 95 and a toothed wheel 96, said grooved pulley 95 being in alinement with the grooved pulley 88 on the shaft 85. Traveling on the grooved pulleys 87 and 91 is a connection 97, while a similar connection 98 travels on the grooved pulleys 88 and 95. The toothed wheels 92 and 96 are so disposed that as the supporting bar 22 and the basket A are elevated, they will be engaged by the resilient tongues 44 and 34 respectively, and upon a rotation of said wheels through the instrumentality of the clutch connection 70 and the toothed disk 68 cause vibratory or shaking movement to be imparted to the basket A and thus remove the surplus chocolate from the confection cores and the basket as desired.

In order to automatically throw out the clutch 54 during the operation of the machine, and stop the rotation of the shaft 50 and the shaft 18 when the basket A has reached its greatest elevation, the following structure is resorted to. Projecting outwardly from the journal blocks 48 and 49 are corresponding bolts 99 and 100, which support a plate 101. Pivotally mounted upon the plate 101 is an angle lever 102, one arm of which is pivotally connected to the clutch yoke 58 by means of a link 103. The free end of the other arm of the angle lever 102, when the clutch 54 is disposed in active position, is positioned slightly above the plate 101 for a purpose that will presently appear. Splined upon the shaft 18 exteriorly of the worm wheel 52 is a collar 104, which is normally held against the outer face of said worm wheel by means of a spring 105 encircling the shaft 18. The inner face of this collar is cammed, as at 106, for coöperation with a finger 107 secured to the inner face of the plate 101 and extending upwardly toward the collar 104. This finger is so positioned with respect to the collar 104 that as the shaft 18 is rotated, it will engage the cammed inner face of said collar and force the latter outwardly on the shaft 18 against the influence of the spring 105. This outward movement of the collar 104 will bring the outer face of said collar substantially in vertical alinement with the angle lever 102 so that a stud 107' extending radially from the periphery of the collar 104 will engage one of the arms of the angle lever 102 when the shaft 18 is rotated. This engagement of the angle lever 102 by the stud 107' will, as a result of the relation of the parts, occur when the basket A has reached its greatest elevation. The pressure of the stud 107' upon the arm of the angle lever 102 will cause said angle lever to rock upon its pivot and through the medium of the connection 103 throw the clutch 54 out of engagement with the belt wheel 53 and thus stop the rotation of the shaft 50 and the shaft 18, and as a result prevent further movement of the basket A until the clutch 54 is again thrown into engagement with the belt wheel 53 through the medium of the lever 59.

Mounted upon the base 10 beneath the tank 12 is a journal plate 108, in which is rotatably supported one end of a vertical shaft 109. This shaft extends centrally through the bottom of the tank 12 and carries at its upper end an agitating dasher 110 disposed within the interior of the tank 12. Fixed upon the shaft 109 between the tank 12 and the base 10 is a belt wheel 111. Mounted upon the base 10 to one side of the tank 12 is a housing 112, within which is disposed a pair of spaced standards 113 and 114 which support at their upper ends bearings 115 and 116 respectively. Journaled in these bearings is a shaft 117. Fixed upon this shaft is a belt wheel 118 disposed in alinement with the belt wheel 53 mounted upon the shaft 56 and a belt connection 119 travels on the belt wheel 53 and the belt wheel 118, through the instrumentality of which the rotation of the shaft 117 is effected. Loosely mounted upon the shaft 117 is another belt wheel 119' and between said last named belt wheel and the belt wheel 118 a clutch 120 is keyed upon the shaft 117. A belt 121 travels on the belt wheels 111 and 119' for the purpose of imparting rotation to the shaft 109. The belt wheel 119' is controlled by the clutch 120 and this clutch is in turn operated by a hand lever 122 pivoted to the housing 112 and having one end operatively connected to a sliding rod 123 mounted in the standards 113 and 114, said rod being operatively connected to the clutch 120 by means of a laterally extending member 124. By this construction, it will be apparent that the agitation of the chocolate contained within the tank 12 can be had at any desired moment by the manipulation of the lever 122 so as to throw in the clutch 120 with respect to the belt wheel 119.

The core supporting frame A comprises specifically a rectangular frame formed of side members 125 and end members 126. The side members 125 are provided with suitable alining openings in which are slidably mounted two sets of rods 127 and 128 respectively, a rod of one set being disposed adjacent the rod of another set and in parallel spaced relation thereto. The rods 127 are mutually connected together at one end by means of a uniting member 129, while the rods 128 are mutually connected together by a uniting member 130; said uniting members 129 and 130 being disposed on opposite sides of the rectangular frame respectively. Secured to the rods 127 is a plurality of supporting rods 131 extending longitudinally of the rectangular frame and in parallel spaced relation to each other. These supporting rods 131 extend through the longitudinal slots 132 in the rods 128 so that when the rods 127 are slid transversely of the rectangular frame, the supporting rods 131 will be capable of a limited movement in unison therewith. Secured to the rods 128 is a plurality of spaced supporting rods 133, which extend parallel to the supporting rods 131 and pass through slots 134 in certain of the bars 127 so that when the rods 128 are slid transversely of the rectangular frame, the supporting rods 133 will be capable of a limited transverse movement in unison therewith.

From this construction, it will be apparent that when the uniting members 129 and 130 are moved simultaneously toward the longitudinal axis of the rectangular frame, the supporting rods 131 and 133 will be moved toward each other, while the opposite movement of said uniting members will cause said supporting rods to be moved away from each other. In order to produce such movement of the uniting members toward and away from the longitudinal axis of the rectangular frame, the following structure is resorted to. The end members 126 of the rectangular frame are each provided centrally with corresponding laterally projecting trunnions 135, upon each of which is rotatably mounted a sleeve 136. These sleeves 136 are each provided with diametrically opposite laterally extending arms 137 and 138, the free ends of which arms terminate in a forked portion. Formed on the uniting member 129 at each end thereof are inwardly extending arms 139, which are disposed substantially in the same vertical plane with the arms 138 carried by the sleeves 136. The free ends of the arms 139 are also forked and a link 140 has one end pivotally connected to the forked free end of the arm 139 and its other end pivotally connected to the forked free end of the arm 138. Likewise, the uniting member 130 has formed on each end inwardly extending arms 141, the free ends of which terminate in a forked portion. These arms 141 lie in substantially the same vertical plane with the arms 137 and are connected to the latter respectively by means of links 142 which have one end pivotally connected to the forked portion of the arm 141 and its other end pivotally connected to the forked portion of the arm 137. Mounted on the uniting member 129 is an operating handle 143, through the manipulation of which the uniting members 129 and 130 are moved toward and away from the longitudinal axis of the rectangular frame. During the movement of the uniting member 129 toward the longitudinal axis of the rectangular frame it will be apparent that the force exerted thereon will be transmitted by means of the links 140 to the rotatable sleeves 137, which latter will in turn rotate and serve to draw the uniting member 130 inwardly toward the longitudinal axis of the rectangular frame in unison with the movement of the uniting member 129. Likewise, the reverse movement of the uniting member 129 will cause the uniting member 130 to be moved in unison in the reverse direction. As has been previously noted, this movement of the uniting members 129 and 130 toward the longitudinal axis of the rectangular frame will effect the movement of the supporting rods 131 and 133 toward each other or to supporting position, while the reverse movement of said uniting members will effect the movement of said supporting rods away from each other or to release position. In the latter position, it will be noted that the supporting rods 131 and 133 are disposed at too great a distance apart to support the confection cores and said cores will as a result be discharged through the bottom of the supporting basket. In order to prevent the confection cores from moving in unison with the supporting rods 131 and 133 when the latter are shifted to release position, there is provided a wire mesh B which is secured at its limits to the top edge of the rectangular frame and overlies the supporting rods 131 and 133. This wire mesh comprises a plurality of longitudinal and transverse wires 144 and 145 respectively. The longitudinal wires 144 are provided with laterally extending fingers 146, while the cross wires 145 are likewise provided with laterally extending fingers 147. These fingers are arranged so as to properly position the confection cores upon the supporting rods 131 and 133 when the latter are in supporting position. When the supporting rods 131 and 133 are moved to release position, it will be apparent that the fingers 146 and 147 being stationary, will serve to hold the confection cores against movement in unison with the supporting rods and will at the same time readily permit the cores to be discharged through the bottom of the basket when said supporting rods have been shifted to release position. Mounted upon each of the trunnions 135 outwardly of the sleeves 136 is a second sleeve 148 which is held against rotation on the trunnion by means of a set screw 149.

Secured on the lower ends of each of the hanger bars 45 and 46 is a tubular extension 150, the lower end of which extension terminates in a transverse eye portion 151 in which the sleeves 148 carried on the trunnions 135 of the core supporting basket are non-rotatably mounted. Formed intermediately of each tubular extension 150 are hollow laterally extending arms 152 which form a journal bearing for a shaft 153. The tubular extension 150 is provided intermediate its ends with a longitudinal slot 154, through which projects a finger 155 fixed on the shaft 153 and extending laterally therefrom. Mounted on each end of the shaft 153 in a fixed manner are brackets 156, which support a rectangular frame 157. Extending transversely of this frame 157 is a plurality of parallel spaced wires 158, the frame 157 and wires 158 serving as a lid to cover the core receiving basket when the shaft 153 is rotated in one direction. Encircling the shaft 153 at each end is a spring 159, which has one end secured to the adjacent hollow arm 152 and the other end secured to the bracket 156. These springs 159 are so arranged that they constantly tend to rotate the shaft 153 so as to move the frame 157 and the wires carried thereby upwardly to uncover the core receiving basket. Mounted on the inner face of each of the uprights 13 and 14 just beneath the grooves 15 and 16 are plates 160, each of which is provided on its inner face with parallel ribs 161 and 162 which are flared outwardly at their upper ends. These plates 160 are so positioned that when the core receiving basket is lowered into the tank 12, the finger 155 will pass between the ribs 161 and 162 and engages the inner face of the plate 160 which will cause the shaft 153 to be rotated so as to move the frames 157 downwardly to a substantially horizontal position across the top of the core receiving basket. When in this position, the frames 157 and the wires 158 carried thereby form a lid or cover which will prevent the cores disposed upon the basket from being buoyed up by the liquid and displaced from the basket. It will be apparent, however, that as soon as the core supporting basket is elevated to such a height as will move the finger 155 out of engagement with the plate 160, the shaft 153 will be rotated so as to move the frames 157 upwardly and thus uncover the core receiving basket.

In order to empty the core receiving basket, it is only necessary to place a tray or placque therebeneath and operate the uniting members 129 and 130 away from the longitudinal axis of the basket A, when the cores will be free to discharge through the bottom of the basket upon the tray or placque.

It will be further noted that the wheels 92 and 96 are provided with an enlarged tooth which is instrumental in effecting the vibration of the core receiving basket at the limit of its upward movement by engagement with the resilient tongues 36 and 44.

What is claimed is:—

1. In a machine of the class described, the combination of a base, a tank supported upon the base, a confection core supporting basket mounted above the tank for movement into and out of the latter, a rotatable shaft, connections between the rotatable shaft and the basket, whereby the rotation of the shaft will move said basket into and out of the tank, and means operated when the basket has reached the limit of its movement out of the tank for disconnecting the basket from said shaft.

2. In a machine of the class described, the combination of a base, a tank supported upon the base, a confection core supporting basket mounted above the tank for movement into and out of the latter, a rotatable shaft, connections between the shaft and basket whereby the rotation of the former will move said basket into and out of the tank, a clutch included in said connections, and means operated when the basket has reached the limit of its movement out of the tank to actuate said clutch and disconnect the basket from the shaft.

3. In a machine of the class described, the combination of a base, a tank supported upon the base, a guide frame supported upon the tank, a rotatable shaft mounted in said guide frame, a confection core supporting basket also mounted in said guide frame and adapted for reciprocation into and out of the tank, connections between the shaft and tank whereby the rotation of the former will reciprocate the latter, a drive shaft supported by said guide frame, connections between the drive shaft and the first named shaft for rotating the latter, a clutch included in said connections, a collar mounted for rotation with and longitudinal movement on the first named shaft, a spring normally holding said collar against longitudinal movement, means for moving said collar longitudinally of the first named shaft during each rotation of the latter, and means operated by the rotation of said collar when the latter has been shifted to the limit of its longitudinal movement for throwing out said clutch and disconnecting the first named shaft from the drive shaft.

4. In a machine of the class described, the combination of a base, a tank supported upon the base, a guide frame supported in the tank, a carrier bar mounted in said guide frame for reciprocation toward and away from the tank, means for moving said carrier bar, a confection core supporting basket hung from said carrier bar and adapted for a limited swinging movement transversely of the guide frame, and automatic means for imparting such swinging movement to the basket during the final movements of the carrier bar away from the tank.

5. A confection core immersing basket, comprising a frame, a plurality of rods slidably mounted in said frame for longitudinal movement transversely of the frame, a uniting member connecting the ends of certain of said rods, a second uniting member connecting the ends of the remainder of said rods, connections between said uniting members whereby the movement of one of said members in one direction will produce a movement of the other member in the opposite direction, and a plurality of supporting bars secured to and extending transversely of the rods secured to each uniting member.

6. A confection core immersing basket, comprising a frame, a plurality of pairs of parallel spaced core supporting rods mounted in said frame, the rods of each pair being adapted for movement toward and away from each other to supporting and release positions respectively, means for moving said rods and stops for engaging and holding the confection cores disposed upon each pair of rods against movement under the influence of the movement of the rods of each pair away from each other.

7. A confection core immersing basket, comprising a frame, a plurality of pairs of parallel spaced rods mounted in said frame, the rods of each pair being adapted for movement toward and away from each other, means for moving said rod, a wire mesh supported by said frame above said rod the members of which are positioned to be disposed on opposite sides of a confection core when the latter is supported by the rod whereby said cores are held against movement under the influence of the movement of the rods of each pair away from each other.

In testimony whereof, we affix our signatures, in presence of two witnesses.

CONSTANTINO BERTOLOTTI.
DIONISIO PICCARDO.

Witnesses:
 Louis Roppo,
 Anthony Stiffa.

---

Copies of this patent may be obtained for five cents each, by addressing the "Commissioner of Patents, Washington, D. C."